United States Patent Office 3,455,849
Patented July 15, 1969

3,455,849
N-SUBSTITUTED AZIRIDINE-TRIALKYLENE-MELAMINE COPOLYMERS
Clarence R. Dick, Lake Jackson, Tex., assignor to The Dow Chemical Company, Midland, Mich., a corporation of Delaware
No Drawing. Filed June 6, 1966, Ser. No. 555,254
Int. Cl. C08g 33/08
U.S. Cl. 260—2.1        2 Claims

ABSTRACT OF THE DISCLOSURE

A resinous polymeric composition suitable for use as an ion exchange material which comprises a minor proportion of a trialkylenemelamine and a major proportion of an N-alkyl-, N-aralkyl-, N-alkaryl-, N-aryl-, N-allyl- or N-cyanoalkyl substituted aziridine. The composition preferaby consists of from 1 to 4 weight percent trialkylenemelamine and remainder of the N-substituted aziridine. Preferable are triethylenemelamine and cyanoethyl aziridine.

---

The present invention relates to novel polymeric compositions prepared from N-substituted aziridines and to a process for preparing them. More particularly, it relates to copolymers comprising a minor amount of a trialkylenemelamine and a major amount of an N-alkyl-, N-aralkyl-, N-alkaryl-, N-aryl-, N-allyl- or N-cyanoalkyl-substituted aziridine. The novel copolymers of the present invention have a demonstrated utility as ion-exchange materials.

Polymers of some N-substituted aziridines are known in the art. Fo rexample, U.S. Patent 2,626,931, issued Jan. 27, 1953, discloses resinous polymeric products obtained by polymerizing ester-, ketone- or nitrile-substituted aziridines with neutral sulfuric and sulfonic ester catalysts. Self polymers of such N-substituted aziridines as cyanoethyl aziridine are also known in the art. These polymers are soluble in most organic solvents and in aqueous acids.

It has now been discovered that novel polymeric compositions which are insoluble in most organic solvents and in aqueous acids and bases may be prepared from a minor amount of a trialkylenemelamine (2,4,6-tris-(aziridinyl)-s-triazine) and a major amount of certain N-alkyl-, N-aralkyl, N-alkaryl, N-aryl, N-allyl, or N-cyanoalkyl-substituted aziridines, as set forth below (hereinafter N-substituted aziridines). The novel polymeric compositions of the present invention contain, in combined form, from about 0.2 to about 6 percent by weight, polymer basis, of the trialkylenemelamine and from about 96 to about 99.8 percent by weight of the N-substituted aziridine. They are prepared by mixing the indicated proportions of trialkylenemelamine and N-substituted aziridine in the presence of an organic solvent that is nonreactive with these monomers under the reaction conditions employed herein (hereinafter an inert solvent) in an amount at least sufficient to dissolve the comonomers, in the presence of an acidic polymerization catalyst. The resulting mixture is digested at a temperature between about 5° C. and about 100° C. for a time sufficient to result in precipitation of the resulting polymeric product. In a preferred embodiment, the novel polymeric compositions of this invention contain from about 1 to about 4 percent by weight of the trialkylenemelamine and from about 96 to about 99 percent by weight of the N-substituted aziridine.

Methods of preparing N-substituted aziridines for use in the practice of this invention are known in the art. For example, cyanoethyl aziridine may be prepared by combining acrylonitrile and ethylenimine according to the procedure described by H. Bestian, Annalen 566, 210 (1950); C.A. 44, 5805 (1950). Other N-substituted aziridines suitable for preparing the novel copolymers of the present invention include phenethyl aziridine, ethylphenyl aziridine, allyl aziridine, butyl aziridine, phenyl aziridine, and the like. Methods for preparing these and similar N-substituted aziridines are also reviewed by Bestian. Preferably, the groups substituted on the nitrogen atom of the aziridine ring should contain from 1 to about 12 carbon atoms.

Methods for preparing trialkylenemelamines have been reviewed by V. P. Wystrach et al., J.A.C.S. 77, 5915 (1955). Typically, trialkylenemelamines, such as triethylenemelamine and tripropylenemelamine are prepared from cyanuric chloride and an alkylenimine, such as ethylenimine or propylenimine.

Representative suitable inert solvents for the practice of this invention, which may be used either singly or as mixtures, include the alcohols containing from 1 to 4 carbon atoms, such as methyl alcohol, ethyl alcohol, isopropyl alcohol, n-butyl alcohol, and the like; the aliphatic hydrocarbons containing from about 4 to about 10 carbon atoms, such as isobutane, pentane, n-hexane, heptane, isooctane, n-octane, decane, and the like; cycloaliphatic hydrocarbons, such as cyclohexane, methyl- and dimethyl-substituted hexanes (e.g. 2-methyl and 2-ethyl hexanes), and the like; aromatic hydrocarbons such as benzene, toluene and the like; ethers, such as diethyl ether, dimethyl and diethyl ethers of ethylene glycol, diethylene glycol, and the like. The preferred solvents are the aliphatic hydrocarbons containing from 4 to 10 carbon atoms.

In general, any inorganic or orgaic or Lewis acid polymerization catalyst is suitable for the preparation of the novel polymers of the present invention. Examples of suitable acid polymerization catalysts include mineral acids, such as hydrochloric acid, hydrobromic acid, sulfuric acid, and the like; organic acids, such as acetic acid, p-toluene sulfonic acid, trichloroacetic acid, trifluoroacetic acid, and the like; Lewis acids, such as aluminum trichloride, and the like. The preferred acid catalyst is sulfuric acid.

The amount of the catalyst used may be from about 0.5 percent by weight to about 20 percent by weight or higher, total monomers basis. An amount of the catalyst sufficient to produce polymerization under the conditions specified herein is all that is required (hereinafter a catalytic amount). Generally, in practice, about 1 weight percent, total monomers basis, has been found desirable to allow the polymerization to be carried out within practical time periods.

In practice, the copolymers of this invention are prepared by mixing the trialkylenemelamine and the N-substituted aziridine in the inert solvent. This mixture is cooled to about 0° C. and the acid polymerization catalyst is added. The mixture is allowed to warm, and polymerization starts at about 5° C., with beginning precipitation of the copolymer. The mixture may be heated up to about 100° C. and digested further to insure completion of the copolymerization. Essentially complete conversion of the monomers used takes place under these conditions.

The following examples describe completely representative specific embodiments and the best modes contemplated by the inventors for practicing the invention claimed. The invention is limited only by the scope of the claims appended hereto.

EXAMPLE 1

Into a reaction vessel equipped with means for stirring and temperature control is placed 300 ml. of heptane. To this is added a solution consisting of 2 g. of triethylenemelamine in 50 g. of cyanoethyl aziridine. The resulting mixture is cooled to 0° C., 2 ml. of 25 percent by weight aqueous sulfuric acid is added, and the mixture is allowed to warm. Polymerization starts at about 5° C. with beginning precipitation of the polymeric product. After 10 minutes, the mixture is heated to 80° C. and digested at this temperature for 30 minutes.

The resulting white polymeric product may be ground into a powder. The product does not have a definable melting point; it becomes black and spongy at 190° C. It is insoluble in aqueous mineral acids, bases, and the inert organic solvents listed earlier. The product has an ion-exchange capacity of 2.8 milliequivalents per gram, dry basis.

Substitution of phenethyl aziridine, ethylphenyl aziridine, allyl aziridine, and butyl aziridine for the cyanoethyl aziridine used above gives a similar insoluble precipitate suitable for use as an ion exchange material. Additionally, tripropylenemelamine may be substituted for the triethylenemelamine with similar advantageous results.

EXAMPLE 2

A copolymer is prepared according to the procedure of Example 1 from 0.5 g. of triethylenemelamine and 50 g. of cyanoethyl aziridine. A white powder prepared by grinding this product is insoluble in aqueous acids, bases, and the inert solvents listed earlier. It has a melting point between 130° and 135° C.

Substitution of phenyl aziridine for the cyanoethyl aziridine above gives a similar insoluble precipitate suitable for use as an ion-exchange material.

EXAMPLE 3

A copolymer is prepared according to the procedure of Example 1 from 0.1 g. of triethylenemelamine and 50 g. of cyanoethyl aziridine. The resulting product is insoluble in the above organic solvents and partially soluble in aqueous acids. It has a melting point between 105° and 107° C.

EXAMPLE 4

A copolymer is prepared as in Example 1 from 0.01 g. of triethylenemelamine and 50 g. of cyanoethyl aziridine. The resulting product is soluble in aqueous acid and has a melting point of between 103 and 105° C. These last two examples show the lower range of triethylenemelamine that may be employed. A product that is insoluble in aqueous acid solution is desired for ion-exchange purposes.

Substitution of other organic solvents as earlier described and other acidic polymerization catalysts as earlier described for those of Examples 1-4 gives similar copolymeric products.

What is claimed is:

1. A resinous polymeric composition comprising, in combined form, from about 0.2 to about 6 percent by weight of triethylenemelamine or tripropylenemelamine and from about 94 to about 99.8 percent by weight of N-cyanoethyl aziridine.

2. A composition as defined in claim 1 containing from about 1 to about 4 percent by weight of triethylenemelamine.

References Cited

UNITED STATES PATENTS

| 2,620,315 | 12/1952 | Lundberg | 260—2 |
| 2,626,931 | 1/1953 | Bestian | 260—2 |
| 3,355,437 | 11/1967 | Tesoro et al. | 260—2 |

FOREIGN PATENTS 957,308  8/1949  France.

SAMUEL H. BLECH, Primary Examiner

U.S. Cl. X.R.

260—2, 88.3, 239